Patented May 23, 1939

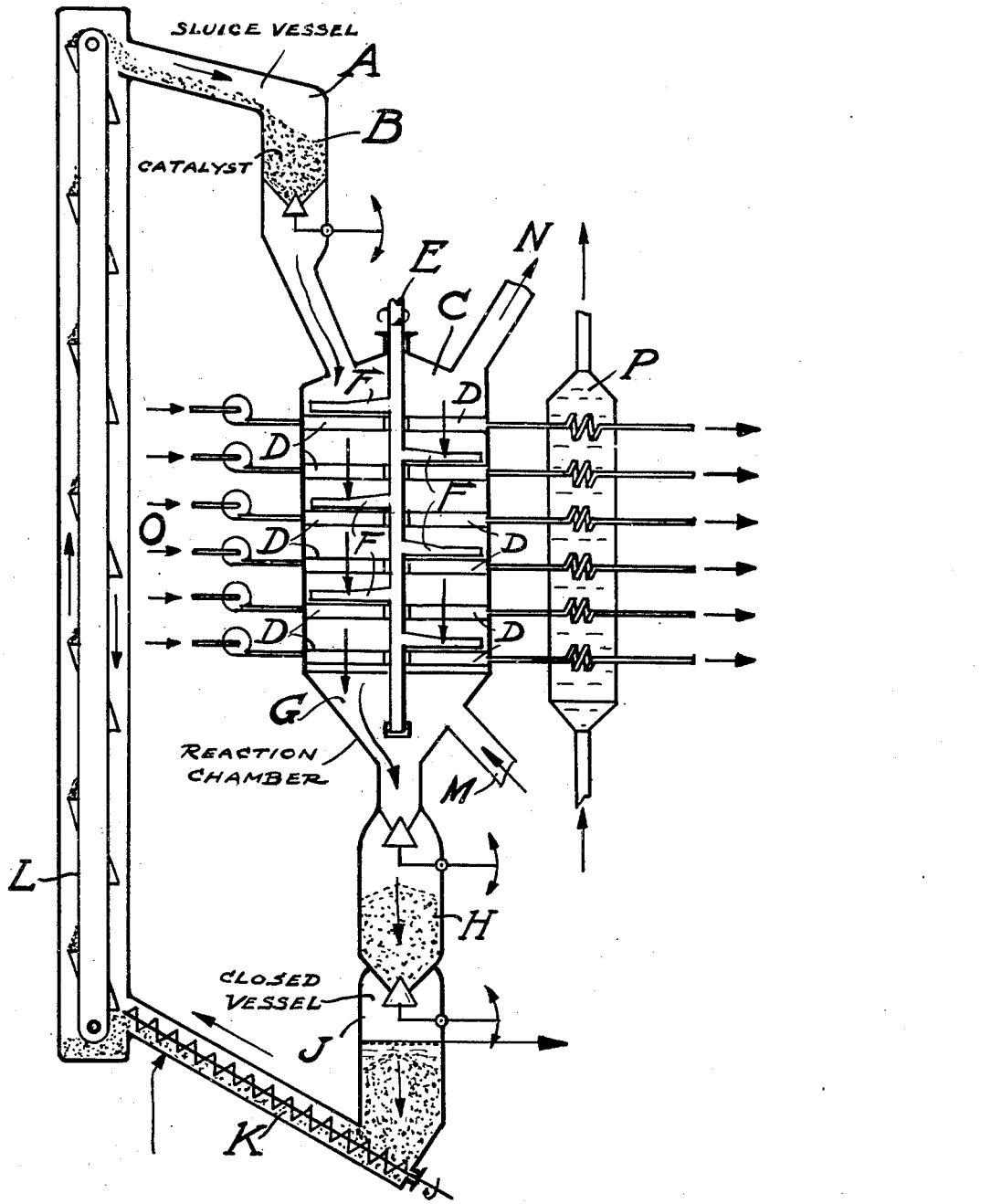

2,159,140

UNITED STATES PATENT OFFICE 2,159,140

PRODUCTION OF HYDROCARBONS FROM CARBON MONOXIDE AND HYDROGEN

Johannes Eckell and Gerhard Ritter, Berlin, Germany, assignors to I. G. Farbenindustrie Aktiengesellschaft, Frankfort-on-the-Main, Germany Application March 5, 1936, Serial No. 67,344
In Germany March 7, 1935

4 Claims. (Cl. 260—449)

The present invention relates to the production of hydrocarbons, in particular higher molecular weight hydrocarbons of the paraffin series, such as paraffin wax, by the thermal interaction of carbon monoxide and hydrogen.

It has already been proposed to prepare paraffin hydrocarbons from carbon monoxide and hydrogen at elevated temperatures in the presence of catalysts at atmospheric or slightly elevated pressure. Depending on the nature of the catalyst, a reduction in its activity takes place sooner or later and this is attributable to deposits on the catalyst of paraffin hydrocarbons of high molecular weight, in particular solid paraffin hydrocarbons. In the known process, the catalysts are usually arranged in stationary thin small tubes or pockets which are externally cooled for the purpose of withdrawing heat. Since in the course of time the passage of the gas is greatly impaired by the deposition of paraffins on the catalysts, overheating readily takes place and consequently injury to the catalyst and to the yields. Hitherto attempts have therefore been made to employ catalysts which yield the largest possible amounts of benzine and middle oil and only small amounts of paraffin hydrocarbons of high molecular weight and which thus have the longest possible life.

We have now found that the said reaction may be carried out in a very advantageous manner in the gaseous phase by continuously leading a solid catalyst during the conversion through the reaction chamber, then freeing the catalyst outside the reaction chamber wholly or partly from the paraffin hydrocarbons deposited thereon and thereupon returning it to the reaction chamber, if desired after further regeneration. The regeneration may be effected in the manner usually employed with catalysts promoting the formation of hydrocarbons from carbon monoxide and hydrogen. Thus the catalysts may be first extracted with a suitable solvent and then treated at an elevated temperature in the presence of hydrogen. If the catalyst contains copper the said treatment with hydrogen may also be dispensed with.

In contrast to the attempts hitherto made to obtain the highest possible yields of benzine, it has been found when working according to this invention that those catalysts are of special advantage which yield the largest possible amount of paraffin hydrocarbons of high molecular weight and which therefore seemed of very little use in the processes hitherto known by reason of premature reduction in activity and which soon rendered necessary an interruption of the process. As catalysts of the said kind may be mentioned especially metals of the eighth group of the periodic system, as for example alkalized iron or nickel, that is to say iron or nickel containing an addition of basic reacting substances, such as oxides, hydroxides or carbonates of alkali metals or alkaline earth metals, said metals of the eighth group of the periodic system being employed, if desired, together with other metals or metal oxides, and with or without the use of carriers.

The velocity of flow of the catalyst through the reaction space depends on the amount and nature of the paraffin wax formed on the catalyst in that the higher is the amount of paraffin wax having a high melting point (in particular wax melting above 80° C.) the more it becomes desirable to remove the catalyst from the reaction space. Usually the catalysts now employed are passed through this space within about from 1 to 3 weeks.

With catalysts having a strong catalytic action the velocity of flow of the reacting gases through the reaction space is about one cubic meter per hour and per liter of catalyst when working under ordinary pressure. With strongly alkalized catalysts it may be of advantage to select a somewhat slower velocity of flow. When working under superatmospheric pressure the velocity of flow of the gases should be increased over that employed under ordinary pressure, but to an extent which is smaller than that of the increase of the pressure. The formation of paraffin wax is promoted in some cases to a remarkable degree by the use of superatmospheric pressures.

Suitable reaction chambers according to this invention are for example so-called plate ovens in which the catalyst is continuously moved in thin layers over superposed plates by means of scrapers. The catalyst moves from plate to plate and finally through the whole of the reaction chamber. A cooling agent, as for example oil, may flow through the inner of the plates (which are made hollow for this purpose) to withdraw the heat of reaction. The reaction gases are introduced at a suitable point into the reaction chamber and flow, for example, in counter-current to the catalyst. The reaction products formed are led into a suitable condensation or adsorption plant for the purpose of separating them from the gases. Tubular bundle ovens, as for example those which are inclined, with or without the insertion of a worm device may also be employed as reaction chambers. By reason of the thin layer of catalyst formed in the tubes by the rotary movement of the oven, a favorable maintenance of the reaction temperature is especially readily obtained since in this manner local overheating of the treated material is avoided; furthermore this method is especially simple to carry out from a mechanical point of view. The oven may be adapted to a great extent to the optimum conditions by suitable adjustment of the angle of inclination or of the speed of rotation. In order to avoid mechanical trouble, iron chains or other mechanical loosening devices may be employed. The catalysts may also be moved through the reaction chamber by a moving band, and the band may be moved on a cooled substratum.

The catalyst may be supplied to the reaction chamber by means of a dosing or sluicing device, preferably while preheating by the waste gases.

The removal of the catalyst from the reaction chamber may be effected in a manner similar to its introduction.

The removal of the paraffin hydrocarbons formed from the catalyst may be carried out in a space directly adjacent to or separate from the withdrawal device as for example by extraction with suitable solvents, as for example middle oil or benzene or pyridine.

When necessary, the catalyst may also be subjected to a regenerating treatment before being returned to the reaction chamber, if desired together with fresh catalyst.

The reaction gases, which contain the hydrocarbons of low boiling point simultaneously formed, are led to a condensation or absorption plant, preferably after or while utilizing their heat content for heating up fresh gas.

The heat withdrawn by the cooling agent supplied to the reaction chamber may be used for the production of steam or for other purposes.

The process according to the present invention is preferably carried out at a temperature between 150° and 300° C. The particular temperature suitable in each single case depends on the nature of the catalyst employed. The pressures are either atmospheric pressure or slightly elevated pressure ranging up to about 10 or even 50 atmospheres. As initial gas water gas containing from about 90 to 95 per cent of carbon monoxide and hydrogen and in which the molecular proportion of the amounts of carbon monoxide and hydrogen is about 1 to 2 is employed with particular advantage. But also other molecular proportions of the amounts of carbon monoxide and hydrogen, as for example the proportion 1 to 1 or 2 to 1 may be employed.

The process according to this invention is not only applicable to the production of valuable hard and soft paraffin wax but also when operating with catalysts which are specially suitable for the production of benzine and higher boiling normally liquid hydrocarbons and the activity of which would rapidly subside when employed in the hitherto usual manner.

The following example, which is given with reference to the accompanying drawing showing an arrangement of apparatus according to this invention, will further illustrate the nature of this invention but the invention is not restricted to this example or to the particular arrangement shown.

*Example*

The catalyst B is supplied to the reaction chamber C by means of a sluice device A. Hollow plates D provided with at least one radial slit are arranged one above another in the chamber C. The catalyst is moved in thin layers over the plates by means of scrapers F mounted on a shaft E and thus traverses the reaction chamber C. The speed of movement is adjusted so that paraffin hydrocarbons of high molecular weight become enriched on the catalyst. The catalyst enriched with paraffin waxes leaves the reaction chamber C at G and passes into the withdrawal device H. The catalyst is wholly or partly freed from adherent paraffin wax in the closed vessel J by extraction with solvents and it is then returned to the sluice vessel A by a conveyor worm K and a bucket conveyor L.

If the process is to be carried out in countercurrent, the initial gases consisting of or containing hydrogen and carbon monoxide are introduced at M. The reaction gases containing vapors of condensation products and unconverted constituents of the initial gases leave at N and are then subjected to fractionation by cooling.

A suitable cooling agent is supplied from O and led, preferably in a special cycle, through the interior of the hollow plates D. The utilization of the heat absorbed by the cooling agent is effected at P.

The time required for the extraction of the catalyst from paraffin wax deposited thereon depends on the nature of this wax. Thus, if the wax is very hard the extraction is usually carried on for a longer time than with soft wax, but also in those cases it will not surpass 12 hours.

What we claim is:

1. In the process for the production of normally solid hydrocarbons of the paraffin series by thermal converion of carbon monoxide and hydrogen in the gaseous phase in the presence of a solid catalyst and under a pressure ranging from atmospheric pressure to 50 atmospheres the step of continuously passing the said catalyst through the reaction space, then freeing it at least partly from solid paraffin hydrocarbons deposited thereon and thereupon supplying it again to the reaction space.

2. In the process as claimed in claim 1, subjecting the solid catalyst freed from solid paraffin hydrocarbons to a regeneration.

3. In the process for the production of normally solid hydrocarbons of the paraffin series by thermal conversion of carbon monoxide and hydrogen in the gaseous phase, in the presence of a solid catalyst and under a pressure ranging from atmospheric pressure to 50 atmospheres, the improvement which comprises passing the said catalyst step by step continuously from one end to the other of the reaction space, freeing it at least partly from solid paraffin hydrocarbons deposited thereon and thereupon supplying it again to the reaction space.

4. In the process as claimed in claim 1 freeing the catalyst, having passed through the reaction space, from solid paraffin hydrocarbons deposited thereon by extraction with a solvent capable of dissolving the said paraffin hydrocarbons.

JOHANNES ECKELL.
GERHARD RITTER.